May 6, 1924.

A. H. KRUESI

PIPE COUPLING

Filed July 3, 1920

1,493,269

Inventor:
August H. Kruesi,
by Albert G. Davis
His Attorney.

Patented May 6, 1924.

1,493,269

UNITED STATES PATENT OFFICE.

AUGUST H. KRUESI, OF SCHENECTADY, NEW YORK, ASSIGNOR TO GENERAL ELECTRIC COMPANY, A CORPORATION OF NEW YORK.

PIPE COUPLING.

Application filed July 3, 1920. Serial No. 393,773.

*To all whom it may concern:*

Be it known that I, AUGUST H. KRUESI, a citizen of the United States, residing at Schenectady, in the county of Schenectady, State of New York, have invented certain new and useful Improvements in Pipe Couplings, of which the following is a specification.

The present invention relates to couplings for connecting together adjacent pipe or conduit ends in a pipe line to make a tight joint and strong mechanical connection between such ends, and has for its object to provide an improved coupling which is particularly well adapted for pipe lines intended to carry fluid at high pressures and temperatures.

For a consideration of what I believe to be novel and my invention, attention is directed to the accompanying description and the claims appended thereto.

Figure 1:
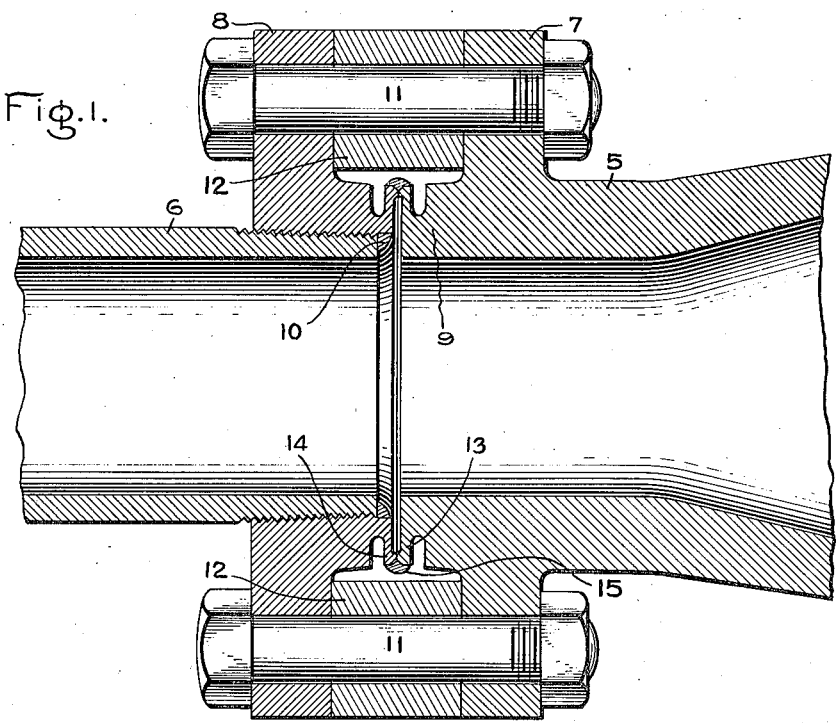
Figure 2:
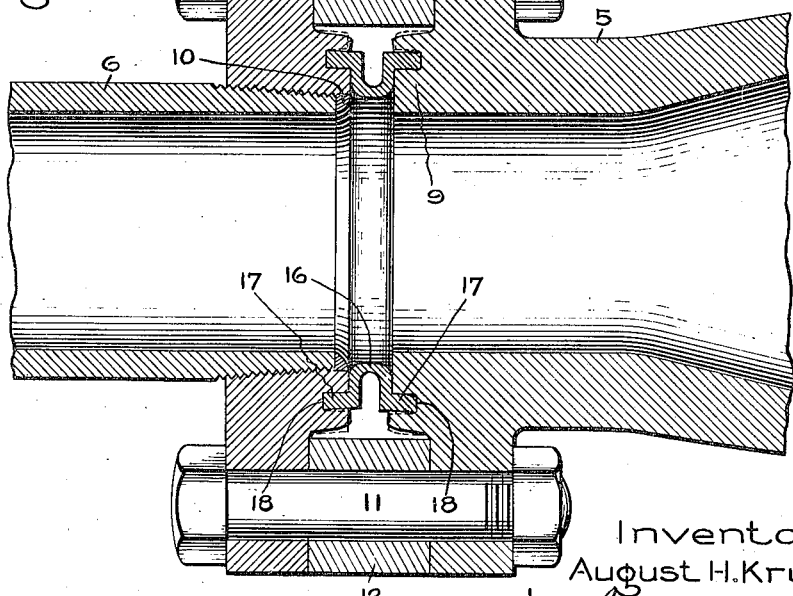

In the drawing, Fig. 1 is a longitudinal sectional view of a pipe coupling embodying my invention, and Fig. 2 is a similar view of a modification.

The use of high pressures in pipe lines, particularly when coupled with high temperatures, such as is met with, for example, in connection with pipe lines for conveying steam of high pressure and superheat, has greatly increased the difficulty of making pipe joints which are sufficiently strong and tight to withstand the very considerable stresses set up in them due to the pressure and to expansion and contraction occasioned by variations in temperature. The stresses due to the latter cause may be very high.

In making a pipe joint two things are necessary; first, that the adjacent pipe ends be mechanically connected, and second, that there be a leak proof sealing connection between them, and in pipe joints commonly met with such mechanical and sealing connections have been structurally interdependent, that is, the mechanical connection has been utilized also to provide the necessary sealing connection, an example of this being the ordinary flanged joint which is bolted together with a gasket or other sealing means between the flanges.

Now, according to my present invention, I make a pipe coupling in which the mechanical connection and the sealing connection between the pipe ends are entirely independent of each other, and said sealing connection is made yieldable or elastic so that it may be compressed or expanded without setting up undue stresses therein.

Referring to the drawing, Figs. 1, 5 and 6 indicate adjacent pipe ends provided with coupling flanges 7, 8. Flanges 7 and 8 may be formed integral with the pipe ends, or they may be formed separately and suitably attached thereto as by welding, shrinking, threading or the like. In the present instance, flange 7 is shown as being formed integral with pipe end 5 and set back slightly from the end of the pipe leaving a projecting portion 9. The pipe end 5 is shown as being thickened somewhat and this may be done by upsetting the end of the pipe when forming the flange or such pipe end may be cast that way as a part of a valve structure, for example. Flange 8 is shown as being threaded over the end of pipe 6 and after being threaded thereon the pipe end may be expanded into firm engagement therewith and welded thereto as indicated at 10. This gives a tight, leak-proof connection, and at the same time facilitates the flow of heat from the pipe to the flange, thereby reducing the temperature stresses in the flange and pipe and tending to keep the joint tight under greater fluctuations of temperature than would otherwise be the case.

The mechanical connection for the joint comprises a number of bolts 11 which pass through openings in the flanges and clamp the flanges against the ends of spacing members 12. Spacing members 12 may be in the form of metallic sleeves, thimbles or washers of correct thickness which surround the bolts between the flanges, or they may be in the form of a metallic ring cut into segments and provided with openings through which the bolts pass. In any event, the spacing members are of sufficient thickness so as to space apart slightly the adjacent pipe ends. When the bolts are tightened up this gives a solid metal to metal mechanical connection for the pipes.

The yielding or elastic sealing connection comprises a ring, U-shaped in cross-section, the two edges of which are connected to the adjacent pipe ends. In the present instance this U-shaped ring is formed by providing annular grooves in adjacent pipe ends thereby forming the two legs 13 and 14 of the U which are welded together as indicated at 15. As is obvious, this forms a yielding or elastic connection between the pipe ends which permits them to expand and contract relatively to each other to a limited degree. The elastic connection avoids throwing any great stress on the mechanical coupling due to the expansion and contraction of the metal lying between flanges 7 and 8. On the other hand slight deformations of the mechanical coupling cannot impose any great stress on the elastic connection. At the same time the joint is absolutely leak proof. The form of elastic connection shown and described is such as to retard the flow of heat from the welding edges into the heavy bodies of metal of the flanges or pipe ends, thereby facilitating the operation of making a sound weld.

In Fig. 2, I have shown a form of my invention which differs from that shown in Fig. 1 in that the sealing ring is made as a separate ring U-shaped in cross section, the two edges of the ring being connected to the adjacent pipe ends mechanically. Otherwise the arrangement in Fig. 2 is the same as that of Fig. 1, and similar reference numerals have been applied to corresponding parts. In the specific arrangement shown in Fig. 2 the U-shaped ring 16 is provided with flanges 17 which are fastened in grooves 18 in the adjacent pipe ends. The grooves may be made slightly larger than the thickness of the flanges, as indicated by the dotted lines, and after flanges 17 are in place the outer walls of the grooves may be calked down into firm engagement with the flanges, the edges of the walls being made to bite into it to form a tight leak-proof connection.

With the above described arrangements, it will be seen that the conduit ends are firmly connected together mechanically by bolts 11 and since this is an all metal to metal connection the bolts may be drawn up as tightly as found desirable. This mechanical connection can be made to give all the strength needed for the joint. On the other hand, the U-shaped sealing ring forms an absolutely leak-proof connection between the pipe ends, and since it is yieldable any slight movements of the pipe ends relatively to each other will not affect it.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In a coupling for adjacent conduit ends, the combination of means for mechanically connecting and spacing said ends in rigid facial alignment, and means independent of and spaced apart from said first-named means for joining said ends to form a continuous conduit, said last-named means comprising a cylindrical member yieldable and unsupported at its center and rigidly secured at its ends in the conduit ends whereby the joint is rendered independently yieldable with respect to the mechanical connection.

2. In a coupling for adjacent conduit ends, the combination of means for mechanically connecting said ends, and a ring U-shaped in cross section which forms a sealing joint between the ends, and which is supported yieldably in relation thereto independently and separately from the mechanical connecting means, the legs of said ring being formed integral with the adjacent conduit ends.

3. In combination, two conduit sections with ends presented for coupling, flanges secured thereon adjacent said ends, means forming a mechanical connection between the flanges, said means serving to hold the conduit ends in spaced facial alignment against mechanical stresses tending to derange such alignment, and means independent of said first-named means and spaced therefrom forming a sealing connection between the conduit ends, said second-named means comprising a yieldable ring U-shaped in cross-section having its legs securely joined with the adjacent conduit ends and having its middle curved portion unsupported to form a yielding fluid-tight seal.

4. In a coupling for pipe lines, the combination with adjacent conduit ends of a metal to metal connection for said ends which holds them in spaced relation to each other and provides the mechanical strength for the coupling, and means independent of and separated from said connection which forms a yieldable sealing connection between said spaced ends, said means including a ring U-shaped in cross-section joined at its ends to the ends of the conduits and unsupported throughout its middle curved portion for rendering the joint yieldable.

In witness whereof, I have hereunto set my hand this 1st day of July, 1920.

AUGUST H. KRUESI.